US010819798B2

(12) United States Patent
Yamagata et al.

(10) Patent No.: US 10,819,798 B2
(45) Date of Patent: Oct. 27, 2020

(54) ON-SITE SYSTEM

(71) Applicant: HITACHI, LTD., Tokyo (JP)

(72) Inventors: Tomoyuki Yamagata, Tokyo (JP); Takahiro Ohira, Tokyo (JP); Yuichi Igarashi, Tokyo (JP); Yoshiyuki Tajima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/302,129

(22) PCT Filed: Jun. 3, 2016

(86) PCT No.: PCT/JP2016/066634
§ 371 (c)(1),
(2) Date: Nov. 16, 2018

(87) PCT Pub. No.: WO2017/208447
PCT Pub. Date: Dec. 7, 2017

(65) Prior Publication Data
US 2019/0312936 A1 Oct. 10, 2019

(51) Int. Cl.
*G06F 15/173* (2006.01)
*H04L 29/08* (2006.01)
(Continued)

(52) U.S. Cl.
CPC ........... *H04L 67/125* (2013.01); *G01D 4/004* (2013.01); *G06Q 50/04* (2013.01); *Y02P 90/30* (2015.11)

(58) Field of Classification Search
CPC ...... H04L 67/125; G01D 4/004; G06Q 50/04; Y02P 90/30
(Continued)

(56) References Cited

U.S. PATENT DOCUMENTS 7,024,474 B2 * 4/2006 Clubb .................. H04L 1/1635 709/223
8,316,005 B2 * 11/2012 Moore ................ H04L 67/2838 707/707
(Continued)

FOREIGN PATENT DOCUMENTS

JP 11-175606 A 7/1999
JP 2010-205218 A 9/2010
JP 2015-210818 A 11/2015

OTHER PUBLICATIONS

Byun, Ji-Won et al. "Purpose based access control for privacy protection in relational database systems." 2008. pp. 1-17. (Year: 2008).*
(Continued)

*Primary Examiner* — Imad Hussain
(74) *Attorney, Agent, or Firm* — Mattingly & Malur, PC

(57) ABSTRACT

An on-site system includes a disclosure-condition-table storage unit and a disclosure-condition-table creation unit. The disclosure-condition-table storage unit stores a disclosure condition table for management of a relationship between a purpose of a service and a data characteristic of on-site data, as a disclosure condition for disclosing the on-site data to a service device that provides the service. The disclosure-condition-table creation unit creates the disclosure condition table in which a purpose of a service included in descriptive information of the service is associated with a data characteristic included in descriptive information of the on-site data, and stores the disclosure condition table in the disclosure-condition-table storage unit.

1 Claim, 12 Drawing Sheets

44t1

ON-SITE-DATA-SPECIFIC DATA-CHARACTERISTIC MANAGEMENT TABLE

| ON-SITE DATA IDENTIFICATION INFORMATION | DATA CHARACTERISTIC FOR INDIVIDUAL ON-SITE DATA | | | |
|---|---|---|---|---|
| | CHARACTERISTIC A | CHARACTERISTIC B | CHARACTERISTIC C | ··· |
| ON-SITE DATA (1) | ○ | ○ | × | |
| ON-SITE DATA (2) | ○ | × | × | |
| ON-SITE DATA (3) | ○ | × | ○ | |
| ON-SITE DATA (4) | × | × | × | |
| ··· | | | | |

ON-SITE-DATA LIST

DATA-CHARACTERISTIC LIST

(51) Int. Cl.
*G01D 4/00* (2006.01)
*G06Q 50/04* (2012.01)

(58) Field of Classification Search
USPC .......................................................... 709/204
See application file for complete search history.

(56) References Cited

U.S. PATENT DOCUMENTS

| | | | | |
|---|---|---|---|---|
| 8,495,729 | B2 * | 7/2013 | Park .................... | H04L 61/6022 726/21 |
| 2001/0037358 | A1 * | 11/2001 | Clubb ................. | H04L 67/2814 709/203 |
| 2004/0153868 | A1 * | 8/2004 | Nonaka .................. | G06Q 10/10 714/47.2 |
| 2004/0260699 | A1 * | 12/2004 | Aoki ................... | G06F 21/6227 |
| 2005/0203916 | A1 * | 9/2005 | Hirose ................... | G06Q 10/10 |
| 2008/0175255 | A1 * | 7/2008 | Krstulich ............ | H04L 41/5054 370/401 |
| 2015/0310072 | A1 | 10/2015 | Dietz et al. | |
| 2016/0055448 | A1 * | 2/2016 | Ellis ..................... | G06Q 10/087 705/28 |

OTHER PUBLICATIONS

Peng, Huanchen et al. "Dynamic Purpose-based Access Control". 2008. pp. 1-6. (Year: 2008).*
Kabir, Enamul et al. "A conditional purpose-based access control model with dynamic roles." 2010. pp. 1-8. (Year: 2010).*
International Search Report of PCT/JP2016/06663 dated Jul. 5, 2016.

* cited by examiner

42t

PURPOSE-SPECIFIC SERVICE MANAGEMENT TABLE

| PURPOSE IDENTIFICATION INFORMATION | SERVICE FOR EACH PURPOSE | | |
|---|---|---|---|
| | SERVICE A | SERVICE B | ... |
| PURPOSE (1) | ○ | ○ | |
| PURPOSE (2) | ○ | × | |
| PURPOSE (3) | × | ○ | |
| PURPOSE (4) | × | × | |
| ... | | | |

SERVICE LIST (braces the PURPOSE (1) row)

PURPOSE LIST (braces the SERVICE A column)

ON-SITE-DATA-SPECIFIC DATA-CHARACTERISTIC MANAGEMENT TABLE

| ON-SITE DATA IDENTIFICATION INFORMATION | DATA CHARACTERISTIC FOR INDIVIDUAL ON-SITE DATA | | | |
|---|---|---|---|---|
| | CHARACTERISTIC A | CHARACTERISTIC B | CHARACTERISTIC C | ... |
| ON-SITE DATA (1) | ○ | ○ | × | |
| ON-SITE DATA (2) | ○ | × | × | |
| ON-SITE DATA (3) | ○ | × | ○ | |
| ON-SITE DATA (4) | × | × | × | |
| ... | | | | |

ON-SITE-DATA LIST

DATA-CHARACTERISTIC LIST

ON-SITE-DATA-SPECIFIC DETAILED-INFORMATION MANAGEMENT TABLE

| DATA NAME | DETAILED INFORMATION FOR INDIVIDUAL ON-SITE DATA | | | |
|---|---|---|---|---|
| | CHARACTERISTIC ID | TYPE | VALUE | ... |
| ON-SITE DATA (1) TEMPERATURE (1) | CHARACTERISTIC A | UNIT | °C | |
| ON-SITE DATA (2) TEMPERATURE (2) | CHARACTERISTIC A | UNIT | F | |
| ON-SITE DATA (3) CONCENTRATION (1) | CHARACTERISTIC A | UNIT | % | |
| ON-SITE DATA (3) CONCENTRATION (1) | CHARACTERISTIC C | ACCURACY | ±0.1% | |
| ... | | | | |

DETAILED-INFORMATION LIST

CONVENTIONAL ON-SITE-DATA-SPECIFIC SERVICE MANAGEMENT TABLE

| ON-SITE DATA IDENTIFICATION INFORMATION | SERVICE FOR INDIVIDUAL ON-SITE DATA | | |
|---|---|---|---|
| | SERVICE A | SERVICE B | ... |
| ON-SITE DATA (1) | ○ | × | |
| ON-SITE DATA (2) | ○ | ○ | |
| ON-SITE DATA (3) | × | × | |
| ON-SITE DATA (4) | × | × | |
| ... | | | |

SERVICE LIST

ON-SITE-DATA LIST

PURPOSE-SPECIFIC DATA-CHARACTERISTIC MANAGEMENT TABLE
(DISCLOSURE CONDITION TABLE)

| PURPOSE IDENTIFICATION INFORMATION | DATA CHARACTERISTIC FOR EACH PURPOSE | | | |
|---|---|---|---|---|
| | CHARACTERISTIC A | CHARACTERISTIC B | CHARACTERISTIC C | ... |
| PURPOSE (1) | ○ | ○ | | |
| PURPOSE (2) | ○ | × | | |
| PURPOSE (3) | × | ○ | | |
| PURPOSE (4) | × | × | | |
| ... | | | | |

DATA-CHARACTERISTIC LIST

PURPOSE LIST

PURPOSE-SPECIFIC SERVICE MANAGEMENT TABLE

| PURPOSE IDENTIFICATION INFORMATION | | SERVICE FOR EACH PURPOSE | | |
|---|---|---|---|---|
| | | SERVICE A | SERVICE B | ··· |
| PURPOSE: 1 | DISCLOSURE LEVEL: 1 | ○ | × | |
| | DISCLOSURE LEVEL: 2 | × | ○ | |
| PURPOSE: 2 | DISCLOSURE LEVEL: 1 | × | × | |
| PURPOSE: 3 | DISCLOSURE LEVEL: 1 | ○ | ○ | |
| ··· | | | | |

SERVICE LIST

PURPOSE LIST

PURPOSE-SPECIFIC DATA-CHARACTERISTIC MANAGEMENT TABLE

| PURPOSE IDENTIFICATION INFORMATION | | DATA CHARACTERISTIC FOR EACH PURPOSE | | |
|---|---|---|---|---|
| | | CHARACTERISTIC A | CHARACTERISTIC B | ··· |
| | | SCORE: 1 | SCORE: 20 | ··· |
| PURPOSE: 1 | DISCLOSURE LEVEL: 1 | ○ | × | ··· |
| | DISCLOSURE LEVEL: 2 | ○ | ○ | ··· |
| PURPOSE: 2 | DISCLOSURE LEVEL: 1 | × | ○ | ··· |
| PURPOSE: 3 | DISCLOSURE LEVEL: 1 | × | × | ··· |
| ··· | | | | |

DATA-CHARACTERISTIC LIST

PURPOSE LIST

ON-SITE SYSTEM

TECHNICAL FIELD

The present invention relates to an on-site system.

BACKGROUND ART

In recent years, for the purpose of providing services utilizing big data, there has been provided a data management system capable of collectively managing on-site data collected from factory facilities, on-site equipment, and the like. In the following description, for example, visualization of an amount of electric power measured in a factory or acquisition of an operation rate from the number of products produced per line is referred to as "service". Such a service is provided to a user by, for example, a service device configured as a Web server.

A type and a structure of individual on-site data are different, and the service device cannot understand the meaning by only the on-site data. Therefore, the data management system manages the on-site data itself in association with descriptive information such as the meaning of the on-site data and how to read the on-site data, so that the service device can provide the service using the on-site data to a user.

For example, PTL 1 discloses a technique of generating a recommendation in response to a query based on context of a user, context of user's activity, and contents of the query, and returning the recommendation to a computing device. In this PTL 1, the context is used as descriptive information.

CITATION LIST

Patent Literature

PTL 1: JP 2015-210818 A

SUMMARY OF INVENTION

Technical Problem

In a case where an organization using on-site data is highly related to an on-site system that has created the on-site data, using the technique disclosed in PTL 1 is effective when this organization provides services using the on-site data to users of services. In recent years, in addition to a case where only one organization uses on-site data, using this on-site data is spreading in other services of other organizations that are less related to the on-site system. However, in the technique disclosed in PTL 1, it has not been considered to effectively use the on-site data in other organizations.

In order for other organizations to use the on-site data, it is important to manage the on-site data used for services that can be provided by on-site systems in other organizations. Therefore, an administrator of the on-site system has been managing a relation table between services and the on-site data, to respond to a use request for the on-site data requested to the on-site system from other organizations. This relation table has been composed of service items indicating contents of services that can be provided by each organization to users, and on-site data items indicating contents of on-site data that can be disclosed to other organizations by the on-site system.

However, the contents of the service items change with the times and a service requested by the user, and the contents of the on-site data items change with renovation of the on-site facility and the like. Therefore, the administrator of the on-site system has to update the relation table frequently, and burden on the administrator for management of the relation table has been large.

The present invention has been made in view of such circumstances, and an object thereof is to reduce burden on an administrator for management of the relation table, so that the service device can effectively use on-site data.

Solution to Problem

An on-site system according to the present invention includes a disclosure-condition-table storage unit and a disclosure-condition-table creation unit.

The disclosure-condition-table storage unit stores a disclosure condition table for management of a relationship between a purpose of a service and a data characteristic of on-site data, as a disclosure condition for disclosing the on-site data to a service device that provides the service.

The disclosure-condition-table creation unit creates a disclosure condition table in which a purpose of a service included in descriptive information of the service is associated with a data characteristic included in descriptive information of on-site data, and stores the disclosure condition table in the disclosure-condition-table storage unit.

Advantageous Effects of Invention

According to the present invention, in the on-site system, it is sufficient to manage a relationship between a service purpose with a small update amount and the data characteristic, as the disclosure condition for disclosing the on-site data to the service device, enabling reduction of burden on the administrator for management of the relation table.

The problems, configurations, and effects other than those described above will be clarified by the description of the embodiments below.

BRIEF DESCRIPTION OF DRAWINGS

FIG. 4 is a configuration view of an on-site-data-specific data-characteristic management table according to the first embodiment of the present invention.

FIG. 5 is a configuration view of an on-site-data-specific detailed-information management table according to the first embodiment of the present invention.

FIG. 6 is a configuration view of a conventional management table.

FIG. 7 is a configuration view of a purpose-specific data-characteristic management table according to the first embodiment of the present invention.

FIG. 12 is a configuration view of a purpose-specific service management table according to the second embodiment of the present invention.

FIG. 13 is a configuration view of a purpose-specific data-characteristic management table according to the second embodiment of the present invention.

DESCRIPTION OF EMBODIMENTS

Figure 1:
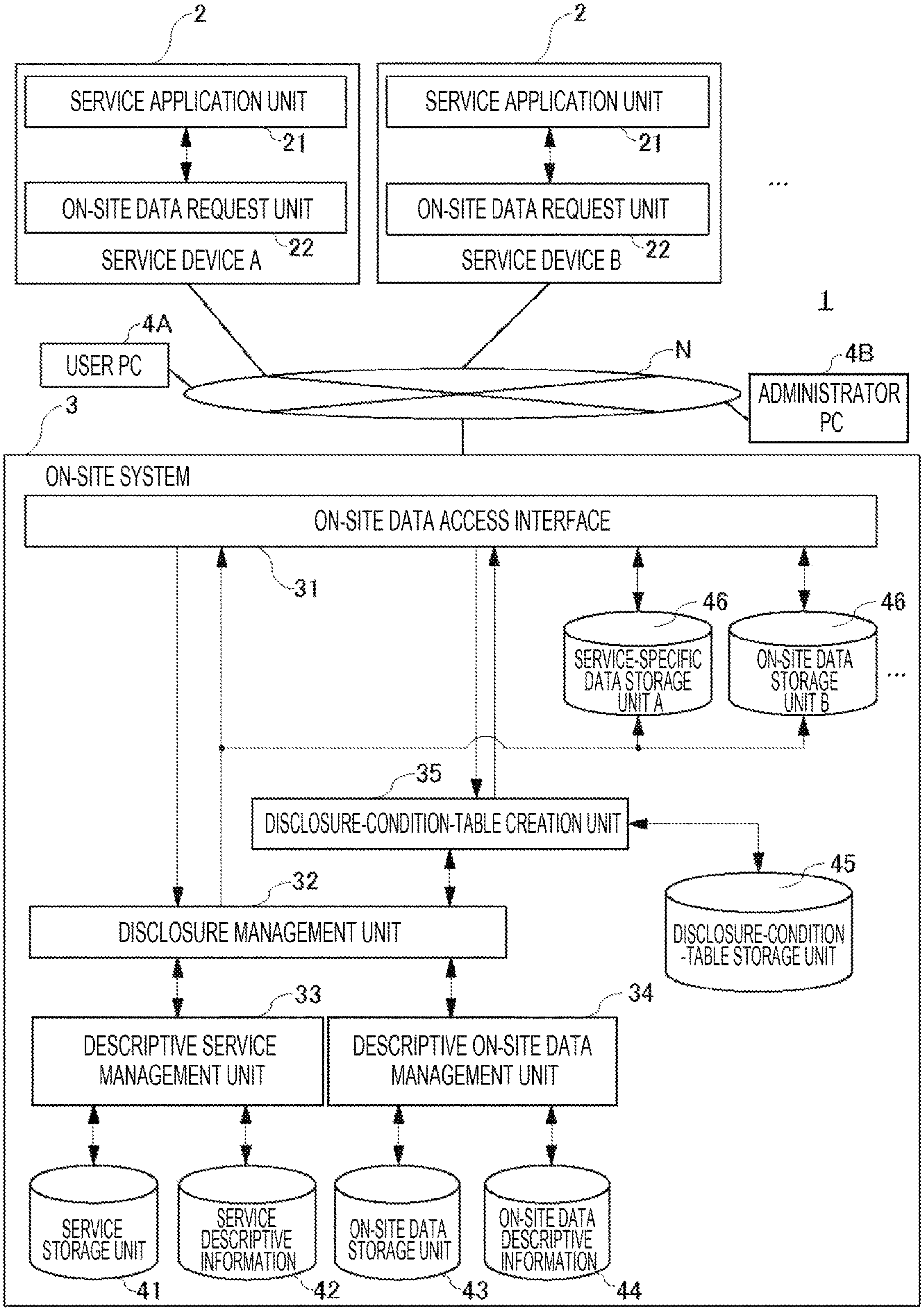
FIG. 1 is a block diagram showing an internal configuration example of a data management system according to a first embodiment of the present invention.

Hereinafter, embodiments of the present invention will be described with reference to the accompanying drawings. In this specification and the drawings, components having substantially the same function or configuration are denoted by the same reference numerals, and redundant explanations are omitted.

First Embodiment

First, a configuration of a data management system will be described with reference to FIGS. 1 to 8. Thereafter, with reference to FIG. 9 and FIG. 10, processing in which an on-site system transmits on-site data to a service device will be described.

FIG. 1 is a block diagram showing an internal configuration example of a data management system 1.

The data management system 1 includes a service device 2, an on-site system 3, a user personal computer (PC) 4A, and an administrator PC 4B. The service device 2 and the on-site system 3 are connected via a network N and are capable of mutually communicating data. As the network N, for example, a local network in an organization, the Internet, or the like is used.

The service device 2 uses data of the on-site system 3, and for example, a Web server is used as the service device 2. This service device 2 is configured for each service such as service A or B, for example, and in the figure, the service device 2 capable of providing service A to a user is represented as "service device A". In the following description, when services A and B are not distinguished, they are collectively referred to as "service".

The user personal computer (PC) 4A connected to the network N can use the service provided from the service device 2 by accessing the service device 2. Therefore, the service device 2 is used as a Web application programming interface (API) as viewed from the user PC 4A. Note that FIG. 1 shows an example in which one service device 2 provides one service to the user PC 4A, but one service device 2 may provide a plurality of services to the user PC 4A.

The service device 2 includes a service application unit 21 and an on-site data request unit 22.

The service application unit 21 provides a service based on on-site data, to the user using the user PC 4A through the network N.

The on-site data request unit 22 requests the on-site system 3 through the network N for on-site data to be used by a service generated by the service application unit 21, and acquires the on-site data from the on-site system 3. The on-site data requested by the on-site data request unit 22 differs for each service that can be provided by the service device 2 to the user. Further, the on-site data is included in an integrated list shown in FIG. 8 to be described later.

In the on-site system 3, various settings are managed by the administrator PC 4B connected to the network N. The administrator PC 4B is a PC used by an administrator of the on-site system 3. The on-site system 3 can provide the service device 2 with on-site data associated with a data characteristic of on-site data selected from a disclosure-condition-table storage unit 45 in accordance with a purpose of a service to be provided by the service device 2.

The on-site system 3 includes an on-site data access interface 31, a disclosure management unit 32, a descriptive service management unit 33, a descriptive on-site data management unit 34, and a disclosure-condition-table creation unit 35. Further, the on-site system 3 includes a service storage unit 41, service descriptive information 42, an on-site data storage unit 43, on-site data descriptive information 44, the disclosure-condition-table storage unit 45, and a service-specific data storage unit 46.

The on-site data access interface 31 functions as an interface that is responsible for transmitting and receiving various data between each part in the on-site system 3 and the service device 2. The on-site system 3 passes on-site data corresponding to a service requested from the service device 2 through the on-site data access interface 31. At this time, the service device 2 can acquire on-site data from the disclosure management unit 32 in real time through the on-site data access interface 31. In addition, the service device 2 can access the service-specific data storage unit 46 through the on-site data access interface 31, and acquire necessary on-site data at certain time intervals or at a predetermined time.

The disclosure management unit 32 manages operations of the descriptive service management unit 33, the descriptive on-site data management unit 34, and the disclosure-condition-table creation unit 35. The disclosure management unit 32 creates an integrated list including on-site data that can be disclosed for each service device 2, based on the disclosure condition set for each service purpose stored in the disclosure-condition-table storage unit 45. Then, the disclosure management unit 32 provides on-site data corresponding to the data characteristic associated with a service purpose, to the service device 2. Here, the disclosure management unit 32 can provide the on-site data to the service device 2 in real time. In addition, the disclosure management unit 32 can also store the on-site data in the service-specific data storage unit 46 that can be read by the service device 2 at any timing.

The descriptive service management unit 33 executes processing for acquiring a service list, which is a list of service names, from the service storage unit 41, and manages association between each service shown in the service list and descriptive information of a service stored in the service descriptive information 42. In addition, the descriptive service management unit 33 manages update of the service names stored in the service storage unit 41 and update of descriptive information of a service stored in the service descriptive information 42.

The descriptive on-site data management unit 34 executes processing for acquiring an on-site-data list, which is a list of on-site data, from the on-site data storage unit 43, and manages association between individual on-site data shown in the on-site-data list and descriptive information of on-site data stored in the on-site data descriptive information 44. In addition, the descriptive on-site data management unit 34 manages update of on-site names stored in the on-site data storage unit 43 and update of descriptive information of on-site data stored in the on-site data descriptive information 44. The descriptive information of on-site data includes, for example, a power consumption amount, a production number, and an operating time.

The disclosure-condition-table creation unit 35 creates a purpose-specific data-characteristic management table **45*t* (see FIG. 7 to be described later) in which a purpose of a service included in descriptive information of the service is associated with a data characteristic included in descriptive information of on-site data, and stores in the disclosure-condition-table storage unit 45. The purpose-specific data-characteristic management table 45*t* is created based on the service descriptive information 42 and the on-site data descriptive information 44, and used as an example of the disclosure condition table showing disclosure conditions of on-site data provided by the on-site system 3 to the service device 2. Therefore, the disclosure-condition-table creation unit 35 acquires a purpose of a service included in descriptive information of the service managed by the descriptive service management unit 33 through the disclosure management unit 32, and a data characteristic included in descriptive information of on-site data managed by the descriptive on-site data management unit 34. The disclosure-condition-table creation unit 35 creates or updates the purpose-specific data-characteristic management table 45*t*** based on the purpose the service and the data characteristic.

The service storage unit 41 stores a list of services that use on-site data, as a service list. The service storage unit 41 stores, for example, a service list such as services A and B.

The service descriptive information 42 stores descriptive information of a service. The descriptive information of a service includes a service purpose (e.g., power visualization, monitoring of device operation rate). The service descriptive information 42 stores, for example, a purpose list for each service such as purposes (1) and (2), and stores a service list for each purpose.

The on-site data storage unit 43 stores a list of on-site data as an on-site-data list. The on-site data storage unit 43 stores, for example, an on-site-data list such as on-site data (1) and (2).

The on-site data descriptive information 44 stores descriptive information of on-site data. The descriptive information of on-site data is also referred to as "data characteristic". The data characteristic includes, for example, descriptive information such as a data unit for individual on-site data, a sensing accuracy, a maximum value or a minimum value that can be sensed. The on-site data descriptive information 44 stores, for example, a data-characteristic list for individual on-site data such as characteristics A and B, and stores an on-site-data list for each characteristic.

The disclosure-condition-table storage unit 45 manages correspondence between each service purpose (visualization, operation rate management, and the like) and a data characteristic required by the service purpose. Then, the disclosure-condition-table storage unit 45 stores the purpose-specific data-characteristic management table **45*t* (FIG. 7 described later) for management of a relationship between a purpose of a service and a data characteristic of on-site data, as a disclosure condition for disclosing the on-site data to the service device 2 that provides the service. The purpose-specific data-characteristic management table 45*t*** stores a purpose list for each characteristic of on-site data and a data-characteristic list for each purpose.

The service-specific data storage unit 46 stores on-site data that can be used by the service device 2. For example, on-site data to be used by service A that can be provided by the service device 2 is stored in the service-specific data storage unit 46 written as "service-specific data storage unit A".

Next, a hardware configuration of a computer C constituting each system and device of the data management system 1 will be described.

Figures 2, 3:
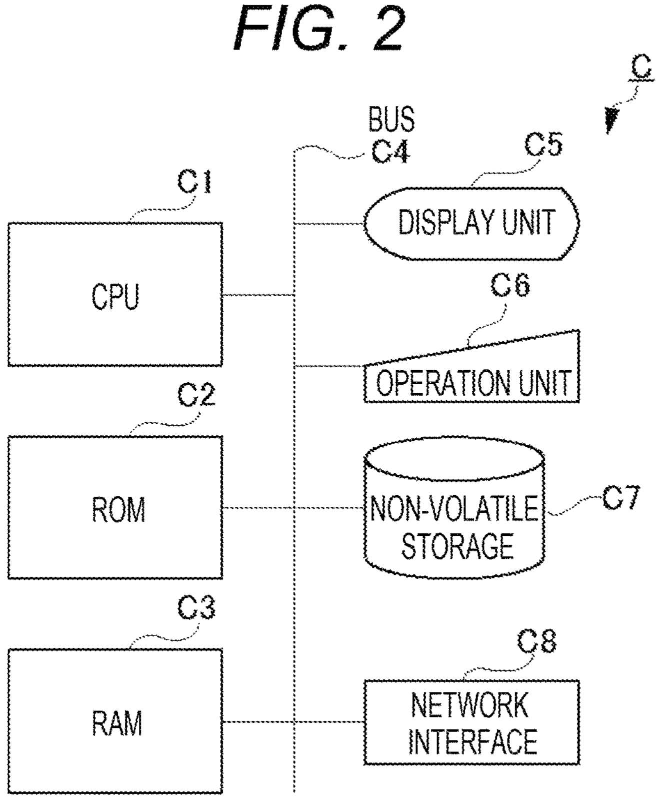
FIG. 2 is a block diagram showing a hardware configuration example of a computer according to the first embodiment of the present invention.
FIG. 3 is a configuration view of a purpose-specific service management table according to the first embodiment of the present invention.

FIG. 2 is a block diagram showing a hardware configuration example of the computer C.

The computer C is hardware used as a so-called computer. The computer C includes a central processing unit (CPU) C1, a read only memory (ROM) C2, and a random access memory (RAM) C3 each connected to a bus C4. Further, the computer C includes a display unit C5, an operation unit C6, a non-volatile storage C7, and a network interface C8.

The CPU C1 reads a program code of software that realizes each function according to the present embodiment from the ROM C2, and executes the program code. In the RAM C3, variables, parameters, and the like generated during arithmetic processing are temporarily written. Execution of processing in each system and device according to the present embodiment is mainly realized by the CPU C1 executing the program code.

For example, the display unit C5 is a liquid crystal display monitor, and displays results and the like of processing executed by the computer C, to the user. For example, a keyboard, a mouse, and the like are used as the operation unit C6, and the user can perform predetermined operation inputs and instructions. For example, the user PC 4A displays a predetermined screen on the display unit C5 and receives an operation input from the user through the operation unit C6. Similarly, the administrator PC 4B displays a predetermined screen on the display unit C5 and receives an operation input from the administrator through the operation unit C6. Meanwhile, the configuration of the display unit C5 and the operation unit C6 is unnecessary when the on-site system 3 is realized as one device.

As the non-volatile storage C7, for example, there is used a hard disk drive (HDD), a solid state drive (SSD), a flexible disk, an optical disk, a magneto optical disk, a CD-ROM, a CD-R, a magnetic tape, a non-volatile memory, or the like. In this non-volatile storage C7, in addition to an operating system (OS) and various parameters, a program for causing the computer C to function is recorded. For example, a network interface card (NIC) or the like is used as the network interface C8, and various data can be transmitted and received via a local area network (LAN) connected with a terminal, via a dedicated line, and the like.

FIG. 3 is a configuration view of the purpose-specific service management table **42*t*. The purpose-specific service management table 42*t* is configured in the service descriptive information 42**, and indicates a relationship between a service purpose and a service having this purpose.

The purpose-specific service management table 42*t* has items (fields) of purpose identification information and a service for each purpose.

The item of purpose identification information stores purpose identification information for identifying a service purpose. For example, purpose (1) means that the service device 2 displays on-site data by a line graph, and purpose (2) means that the service device 2 displays on-site data in a scatter diagram.

The item of a service for each purpose stores a service corresponding to the service purpose.

As shown in FIG. 3, a column of the purpose-specific service management table 42*t* indicates, with "o", that service purposes required by service A are purposes (1) and (2), while service purposes required by service B are purposes (1) and (3). In this way, a list representing service purposes of each service with "o" is referred to as "purpose list". For example, the purpose list of service A includes purposes (1) and (2), and the purpose list of service B includes purposes (1) and (3). That is, the purpose-specific service management table 42*t* stores a purpose list for each service.

On the contrary, a row of the purpose-specific service management table 42*t* indicates, with "o", that services having purpose (1) are services A and B, and a service having purpose (2) is service A. In this way, a list of services for each purpose that can be provided by the service device 2 is referred to as "service list". For example, the service list of purpose (1) includes services A and B, and the service list of purpose (2) includes service A.

FIG. 4 is a configuration view of an on-site-data-specific data-characteristic management table 44*t*1. The on-site-data-specific data-characteristic management table 44*t*1 is configured in the on-site data descriptive information 44, and indicates a relationship between on-site data and a data characteristic.

The on-site-data-specific data-characteristic management table 44*t*1 has items of on-site data identification information and a data characteristic for individual on-site data.

The item of on-site data identification information stores on-site data identification information for identifying all the on-site data. The item of on-site data identification information stores, for example, information (ID, name, and the like) for identifying each sensor, such as a temperature sensor (1) connected to a controller (1) of an A line.

The item of data characteristic for individual on-site data stores a data characteristic of the on-site data.

As shown in FIG. 4, a column of the on-site-data-specific data-characteristic management table 44*t*1 indicates, with "o", that on-site data having characteristic A is on-site data (1), (2), and (3), while on-site data having characteristic B is on-site data (1). In this way, a list of on-site data having a specific data characteristic is referred to as "on-site-data list".

On the contrary, a row of the on-site-data-specific data-characteristic management table 44*t*1 indicates, with "o", that the data characteristics of the on-site data (1) are characteristics A and B, while the data characteristic of the on-site data (2) is characteristic A. In this way, a list of data characteristics for individual on-site data is referred to as "data-characteristic list".

FIG. 5 is a configuration view of an on-site-data-specific detailed-information management table 44*t*2. The on-site-data-specific detailed-information management table 44*t*2 is configured in the on-site data descriptive information 44, and indicates detailed information of a data characteristic relating to individual on-site data.

The on-site-data-specific detailed-information management table 44*t*2 has items of a data name, a characteristic ID, a type, and a value.

The data name item stores a data name of on-site data. This data name item stores type identification information for specifying a type (e.g., temperature, density) of the on-site data, in addition to the on-site data identification information described above.

The characteristic ID item stores a characteristic ID used as an identifier of a data characteristic.

The type item stores a type (e.g., unit, accuracy) of a data characteristic.

The value item stores a value (e.g., a specific example of a unit such as ° C., F, %, and accuracy) for the data characteristic type.

A column of the on-site-data-specific detailed-information management table 44*t*2 stores a data characteristic for individual on-site data. Here, there are two pieces of on-site data (3) because even a single on-site data may have a plurality of data characteristics.

A row of the on-site-data-specific detailed-information management table 44*t*2 stores detailed information of on-site data. Such detailed information for individual on-site data is referred to as "detailed-information list".

Here, a conventional on-site-data-specific service management table 100*t* will be described.

FIG. 6 is a configuration view of the conventional on-site-data-specific service management table 100*t*.

The on-site-data-specific service management table 100*t* has items of on-site data identification information and a service for individual on-site data.

The item of on-site data identification information stores on-site data identification information for identifying all the on-site data.

The item of a service for individual on-site data stores a service corresponding to on-site data.

Therefore, the conventional on-site-data-specific service management table 100*t* is formed, for example, of an on-site-data list of the on-site data storage unit 43 according to the present embodiment as a column, and a service list of the service storage unit 41 as a row. However, as described above, both the on-site data and the service are data to be updated daily. Therefore, the administrator has been taking a tremendous amount of time and effort to manage a relationship between the on-site data and the service.

Next, the purpose-specific data-characteristic management table 45*t* according to the present embodiment will be described.

FIG. 7 is a configuration view of the purpose-specific data-characteristic management table 45*t*. The purpose-specific data-characteristic management table 45*t* is configured in the disclosure-condition-table storage unit 45. This purpose-specific data-characteristic management table 45*t* indicates a relationship between each service purpose and a data characteristic required by the service purpose.

The purpose-specific data-characteristic management table 45*t* has items of purpose identification information and a data characteristic for each purpose.

The item of purpose identification information stores purpose identification information.

The item of a data characteristic for each purpose stores a purpose list of a service requiring the data characteristic.

This purpose-specific data-characteristic management table 45*t* is a combination of a purpose list corresponding to the purpose-specific service management table 42*t* and a data-characteristic list corresponding to the on-site-data-specific data-characteristic management table 44*t*1. Therefore, a column of the purpose-specific data-characteristic management table 45*t* stores the purpose list, and a row stores the data-characteristic list.

For example, an item indicated by "o" in FIG. 7 represents that on-site data having characteristic A for purpose (1) of a service is transmitted to the service device 2 that provides this service.

Whereas, an item indicated by "x" in FIG. 7 represents that on-site data whose data characteristic for purpose (3) of a service is not characteristic A is not transmitted to the service device 2 that provides this service.

In this way, in the purpose-specific data-characteristic management table 45*t*, service purposes with less information-update amount, and data characteristics are managed. Since the on-site system 3 has the purpose-specific data-characteristic management table 45*t*, the administrator can easily manage information included in the purpose-specific data-characteristic management table 45*t*.

Figure 8:
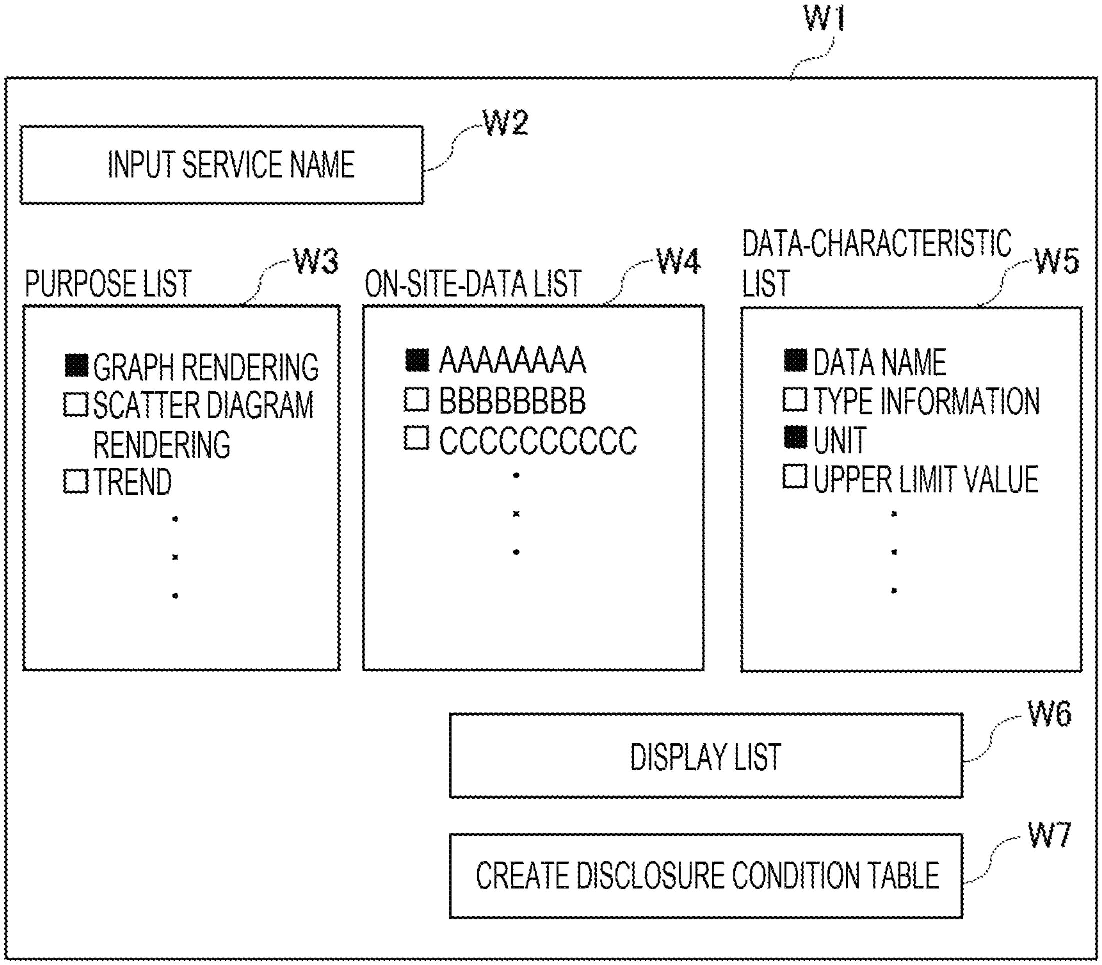
FIG. 8 is a configuration view of a screen that displays a purpose list, a data list, and a data-characteristic list that can be acquired from an on-site system by a service device according to the first embodiment of the present invention.

FIG. 8 is a configuration view of a screen W1 that displays a purpose list, a data list, and a data-characteristic list that can be acquired by the service device 2 from the on-site system 3.

In the screen W1, a service name input area W2 includes a purpose-list area W3, an on-site-data list area W4, a data-characteristic list area W5, a list display button W6, and a disclosure-condition-table creation execution button W7. This screen W1 is displayed on the administrator PC 4B and is operated by the administrator.

The service name input area W2 is used by the administrator to input a name of a service that can be provided by the service device 2.

The purpose-list area W3 displays a purpose list that can be acquired from the purpose-specific data-characteristic management table 45*t*. The administrator can select a purpose of a service to be provided by the service device 2 from a display result of the purpose-list area W3.

The on-site-data list area W4 displays on-site data that can be acquired from the on-site-data-specific data-characteristic management table 44*t*1. The administrator can select on-site data to be used by a service from a display result of the on-site-data list area W4.

The data-characteristic list area W5 displays on-site data characteristics that can be acquired from the purpose-specific data-characteristic management table 45*t*. From the data-characteristic list area W5, the administrator can select an on-site data characteristic of on-site data to be used by a service.

Here, a group of the service name input area W2 and the purpose-list area W3 corresponds to the relationship of the purpose-specific service management table 42*t* shown in FIG. 3.

Further, a group of the on-site-data list area W4 and the data-characteristic list area W5 corresponds to the relationship of the on-site-data-specific data-characteristic management table 44*t*1 shown in FIG. 4.

Furthermore, a group of the purpose-list area W3 and the data-characteristic list area W5 corresponds to the relationship of the purpose-specific data-characteristic management table 45*t* shown in FIG. 7.

The list display button W6 is used to display contents of the areas W3 to W5. When the administrator presses the list display button W6, each list acquired by the service device 2 from the on-site system 3 is displayed in the areas W3 to W5. For example, when the administrator inputs an existing service name in the service name input area W2 and presses the list display button W6, a purpose list, an on-site-data list, and a data-characteristic list corresponding to the existing service are displayed in the areas W3 to W5, respectively. Whereas, when the administrator inputs a new service name in the service name input area W2, the purpose-specific data-characteristic management table 45*t* is not created unless each item of the areas W3 to W5 is selected by the administrator.

The disclosure-condition-table creation execution button W7 is displayed in the areas W3 to W5, and is used to correlate individual data inputted by the administrator with the service inputted in the service name input area W2. When the administrator presses the disclosure-condition-table creation execution button W7, the disclosure-condition-table creation unit 35 creates the purpose-specific data-characteristic management table 45*t* in the disclosure-condition-table storage unit 45.

Figure 9:
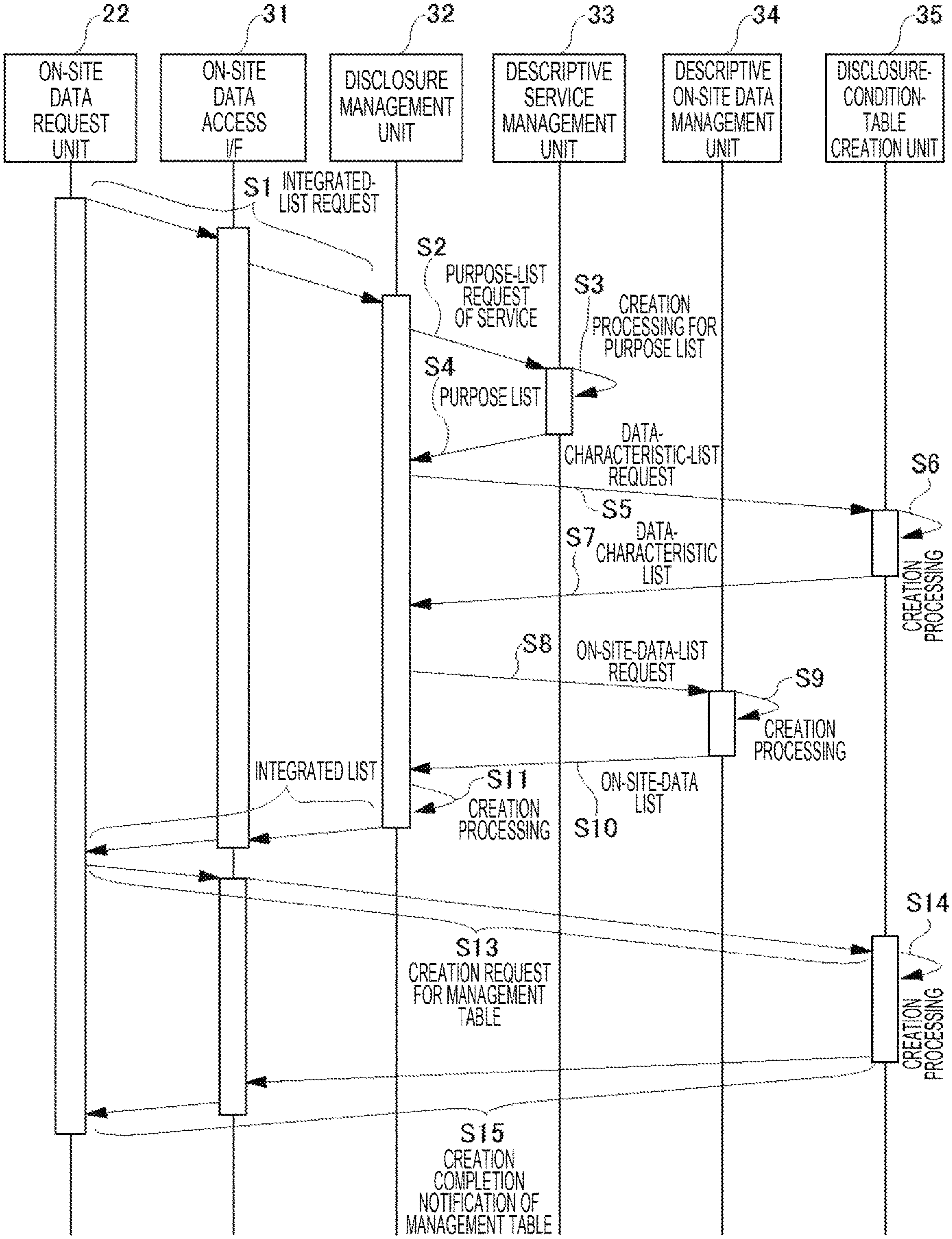
FIG. 9 is a sequence diagram when the on-site system according to the first embodiment of the present invention executes creation processing of the purpose-specific data-characteristic management table.

FIG. 9 is a sequence diagram when the on-site system 3 executes creation processing of the purpose-specific data-characteristic management table 45*t*. Here, a description of processing is separately given in detail to processing (S1 to S12) to be executed by the user of the service through the user PC 4A for an acquisition request for on-site data, and creation processing (S13 to S15) for the management table to be executed by the administrator through the administrator PC 4B.

First, the processing for an acquisition request for on-site data will be described.

When the user of the service accesses the service device 2 by operating the user PC 4A, the service application unit 21 starts processing of acquiring on-site data to be used for a service that can be provided to the user PC 4A. At this time, an integrated-list request for requesting acquisition of an integrated list is transmitted from the on-site data request unit 22 to the disclosure management unit 32 through the on-site data access interface 31 of the on-site system 3 (S1). The integrated list is a list obtained by integrating the purpose list, the data-characteristic list, and the on-site-data list that are disclosed to the service device 2, and is processed inside the service application unit 21 and used for the service.

Upon receiving the integrated-list request, the disclosure management unit 32 transmits a purpose-list request for requesting acquisition of a purpose list for each service to the descriptive service management unit 33 (S2). The purpose-list request includes a service name that can be provided by the service device 2 to the user.

Upon receiving the purpose-list request, the descriptive service management unit 33 creates a purpose list for each service as shown in FIG. 3, based on information stored in the service storage unit 41 and the service descriptive information (S3). Then, the descriptive service management unit 33 returns the purpose list created for each service to the disclosure management unit 32 (S4), whereby the disclosure management unit 32 acquires the purpose list. Note that the detailed processing of step S3 and steps S6, S9, and S11 to be described later will be described with reference to FIG. 10 to be described later.

Next, the disclosure management unit 32 transmits a data-characteristic-list request for requesting acquisition of a data-characteristic list, to the disclosure-condition-table creation unit 35 (S5). The data-characteristic-list request includes the purpose list for each service acquired in step S4.

Based on information stored in the purpose-specific data-characteristic management table 45*t* of the disclosure-condition-table storage unit 45, the disclosure-condition-table creation unit 35 executes creation processing for a data-characteristic list for each service purpose as shown in FIG. 7 (S6). Then, the disclosure-condition-table creation unit 35 returns the data-characteristic list created for each service purpose to the disclosure management unit 32 (S7), whereby the disclosure management unit 32 acquires the data-characteristic list.

Next, based on the acquired data-characteristic list, the disclosure management unit 32 transmits an on-site-data-list request for requesting acquisition of a necessary on-site-data list, to the descriptive on-site data management unit 34 (S8).

Upon receiving the on-site-data-list request, the descriptive on-site data management unit 34 creates an on-site-data list for each data characteristic as shown in FIG. 4, from information stored in the on-site data storage unit 43 and the on-site data descriptive information 44 (S9). Then, the descriptive on-site data management unit 34 returns the on-site-data list created for each data characteristic to the disclosure management unit 32 (S10), whereby the disclosure management unit 32 acquires the on-site-data list. This on-site-data list includes the on-site data read from the on-site data storage unit 43 based on the data-characteristic list.

Next, the disclosure management unit 32 creates an integrated list in which the purpose list, the data-characteristic list, and the on-site-data list are integrated (S11). Then, the disclosure management unit 32 presents the integrated list to the on-site data request unit 22 through the on-site data access interface 31 (S12). The integrated list and the on-site data included in this integrated list are used in internal processing of the service application unit 21 of the service device 2, and are therefore not displayed on the user PC 4A.

Next, creation processing for the purpose-specific data-characteristic management table 45*t* will be described.

The administrator of on-site data inputs a new service name in the service name input area W2 shown in FIG. 8, or changes a purpose list or a data-characteristic list for an existing service. At this time, a necessary part of the purpose-list area W3 and the data-characteristic list area W5 has been selected by the administrator. Then, the administrator presses the disclosure-condition-table creation execution button W7 through the administrator PC 4B.

When the administrator presses the disclosure-condition-table creation execution button W7, the on-site data request unit 22 transmits a creation request for the purpose-specific data-characteristic management table 45*t* to the disclosure-condition-table creation unit 35 through the on-site data access interface 31 (S13). This creation request includes a purpose list selected in the purpose-list area W3 and a data-characteristic list selected in the data-characteristic list area W5.

The disclosure-condition-table creation unit 35 creates the purpose-specific data-characteristic management table 45*t* based on the purpose list and the data-characteristic list included in the creation request received from the administrator PC 4B through the on-site data access interface (S14). If the purpose-specific data-characteristic management table 45*t* has already been created in the disclosure-condition-table storage unit 45, the processing of step S14 is to be processing for updating the purpose-specific data-characteristic management table 45*t*, to be executed based on the purpose list and the data-characteristic list.

Then, the disclosure-condition-table creation unit 35 transmits a completion notification indicating completion of creation of the purpose-specific data-characteristic management table 45*t* to the on-site data request unit 22 through the on-site data access interface 31 (S15). Upon receiving the completion notification, the disclosure-condition-table creation unit 35 can know that creation of the purpose-specific data-characteristic management table 45*t* has been completed.

Figure 10:
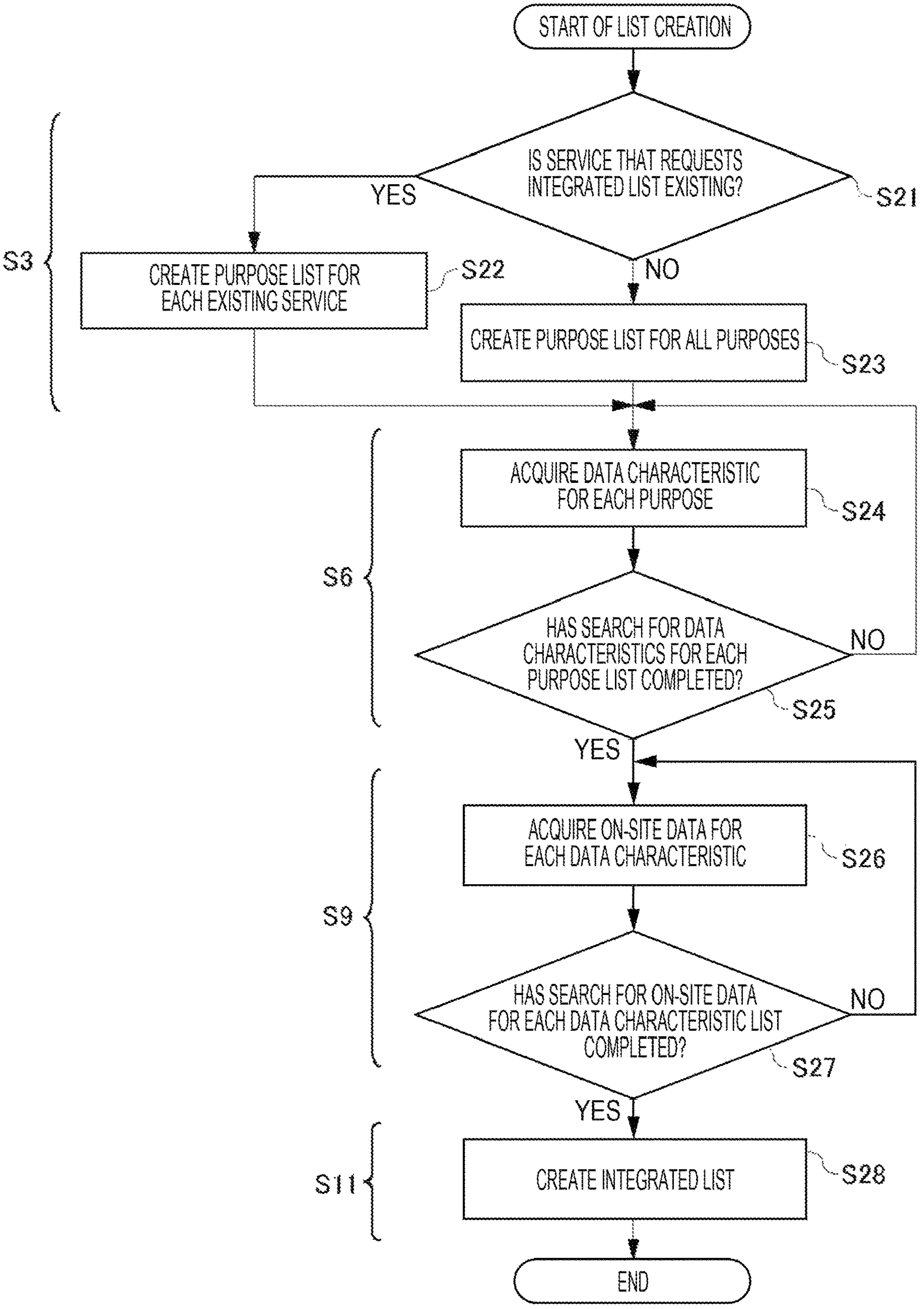
FIG. 10 is a flowchart showing a detailed processing example of steps S3, S6, S9, and S11 in FIG. 9.

FIG. 10 is a flowchart showing a detailed processing example of steps S3, S6, S9, and S11 in FIG. 9.

First, the descriptive service management unit 33 checks whether the service name inputted in the service name input area W2 on the screen W1 is existing or new (S21).

When the inputted service name is existing (YES in S21), the descriptive service management unit 33 creates a purpose list for each existing service specified by the service device 2, based on the purpose-specific service management table 42*t* (S22). Whereas, when the inputted service name is new (NO in S21), the descriptive service management unit 33 creates a purpose list for all purposes corresponding to on-site data that can be provided by the descriptive service management unit 33 to the service device 2 (S23).

After step S22 or S23, the disclosure-condition-table creation unit 35 acquires a data characteristic for each purpose (S24) in order to create a data-characteristic list corresponding to the purpose list created by the descriptive service management unit 33. Then, the disclosure-condition-table creation unit 35 determines whether or not all the data characteristics of the on-site data corresponding to the created purpose have been acquired (S25).

When acquisition of all the data characteristics has not been completed (NO in S25), the disclosure-condition-table creation unit 35 returns to the processing of step S24 and continues the processing of acquiring data characteristics. Whereas, when the acquisition of all the data characteristics has been completed (YES in S25), the disclosure-condition-table creation unit 35 creates a data-characteristic list corresponding to the purpose list based on the acquired data characteristics.

Next, the descriptive on-site data management unit 34 creates an on-site-data list corresponding to the data-characteristic list created in step S25. Therefore, the descriptive on-site data management unit 34 acquires the on-site-data list from the on-site-data-specific data-characteristic management table 44*t*1, and acquires detailed information for individual on-site data included in the on-site-data list, from the on-site-data-specific detailed-information management table 44*t*2 (S26). Then, the descriptive on-site data management unit 34 determines whether or not the acquisition has been completed for all the on-site data corresponding to the data-characteristic list created in step S25 and the detailed information for individual on-site data (S27).

When acquisition has not been completed for all the on-site data and detailed information for individual on-site data (NO in S27), the descriptive on-site data management unit 34 returns to the processing of step S26 and continues the processing of acquiring the on-site data and detailed information of the on-site data. Whereas, when acquisition has been completed for all the on-site data and detailed information for individual on-site data (YES of S27), the descriptive on-site data management unit 34 creates an on-site-data list corresponding to the data-characteristic list, based on the acquired on-site data and detailed information for individual on-site data.

Then, the disclosure management unit 32 creates, as an integrated list, the purpose list created in step S22 or S23, the purpose-specific data-characteristic list created in step S24, and the data-characteristic-specific on-site-data list created in step S26 (S28). This integrated list is transmitted to the service application unit 21 through the on-site data request unit 22. Then, the service application unit 21 can provide the user PC 4A with the service with use of the integrated list.

The on-site system 3 according to the first embodiment described above has the purpose-specific data-characteristic management table 45*t* for management of a data characteristic for each purpose of a service to be provided to the user by the service device 2. This purpose-specific data-characteristic management table 45*t* is formed by the purpose list of the service and the data-characteristic list. Therefore, in the on-site system 3, it is sufficient to manage the purpose list of the service, with low updating frequency of information, and the data-characteristic list, reducing burden on the administrator for management of the purpose-specific data-characteristic management table 45*t*.

In addition, the on-site system 3 creates an on-site-data list based on a data characteristic for a purpose of a service requested from the service device 2, and transmits an integrated list including the on-site-data list to the service device 2. Therefore, the service device 2 can acquire necessary on-site data from the on-site system 3, only by requesting acquisition of the on-site data to the on-site system 3.

In addition, even if new services having a purpose similar to a purpose of existing services are increased, the number of the purposes does not increase, so that the contents of the purpose-specific data-characteristic management table 45*t* need not be largely changed. Whereas, if a data characteristic is changed along with a change and the like in equipment that is managed as a target for acquiring on-site data by the on-site system 3, the data characteristic for the on-site data in the on-site-data-specific data-characteristic management table 44*t*1 is to be changed. However, data characteristics are not frequently changed. Therefore, the on-site system 3 can transmit on-site data for each service device 2 that can provide different services using a same purpose and same on-site data.

Meanwhile, the disclosure management unit 32 may directly access the disclosure-condition-table storage unit 45, and acquire a data-characteristic list for a purpose list of a service from the purpose-specific data-characteristic management table 45*t*. In this case, the disclosure-condition-table creation unit 35 may only create or update the purpose-specific data-characteristic management table 45*t* without creating the data-characteristic list at step S6 in FIG. 9.

Second Embodiment

In the on-site system 3 according to the first embodiment described above, a purpose of a service that can be provided by each service device 2 to the user has been described as being known. This is based on an assumption that the user of the on-site data managed by the on-site system 3 is limited to a specific person, in using the on-site data acquired from the on-site system 3 by the service device 2.

However, contents of on-site data used in a service may vary depending on a disclosure level that has been set in advance. Here, disclosure standards for on-site data that can be used by a service provided by the service device 2 to a user are referred to as "disclosure level". When the disclosure level is low, various services can use the on-site data, but as the disclosure level becomes higher, services that can use the on-site data are limited.

In the on-site system 3 according to the first embodiment, it has been assumed that a disclosure level for a purpose of a service provided by the service device 2 and a disclosure level for a data characteristic have been agreed between the on-site system 3 and the service device 2, and the disclosure level of the data characteristic is equal for each purpose of the service. That is, in the first embodiment, in order for the service device 2 to acquire on-site data from the on-site system 3, arbitration has been made in advance to equalize the disclosure level between the on-site system 3 and the service device 2.

As a service, for example, there is a service of rendering a line graph of sensor values in a time series on a user PC 4A as a purpose of the service for a user to monitor a sensor. Further, for example, there is a service of displaying a trend of sensor values on the user PC 4A. Furthermore, there is also a service of displaying, on the user PC 4A, abnormal threshold information for use by control processing using a sensing error and the sensor together with the sensor value. Then, for individual purposes of these services, on-site data required by a service application unit 21 changes.

However, data characteristics required for respective purposes of the services are also different. Therefore, the on-site system 3 and the service device 2 often have different disclosure levels of on-site data that can be used for each service. Therefore, a method of determining a disclosure level for each purpose of a service for a service device 2 by an on-site system 3A will be described below.

First, a configuration example of the on-site system 3A according to the present embodiment will be described.

Figure 11:
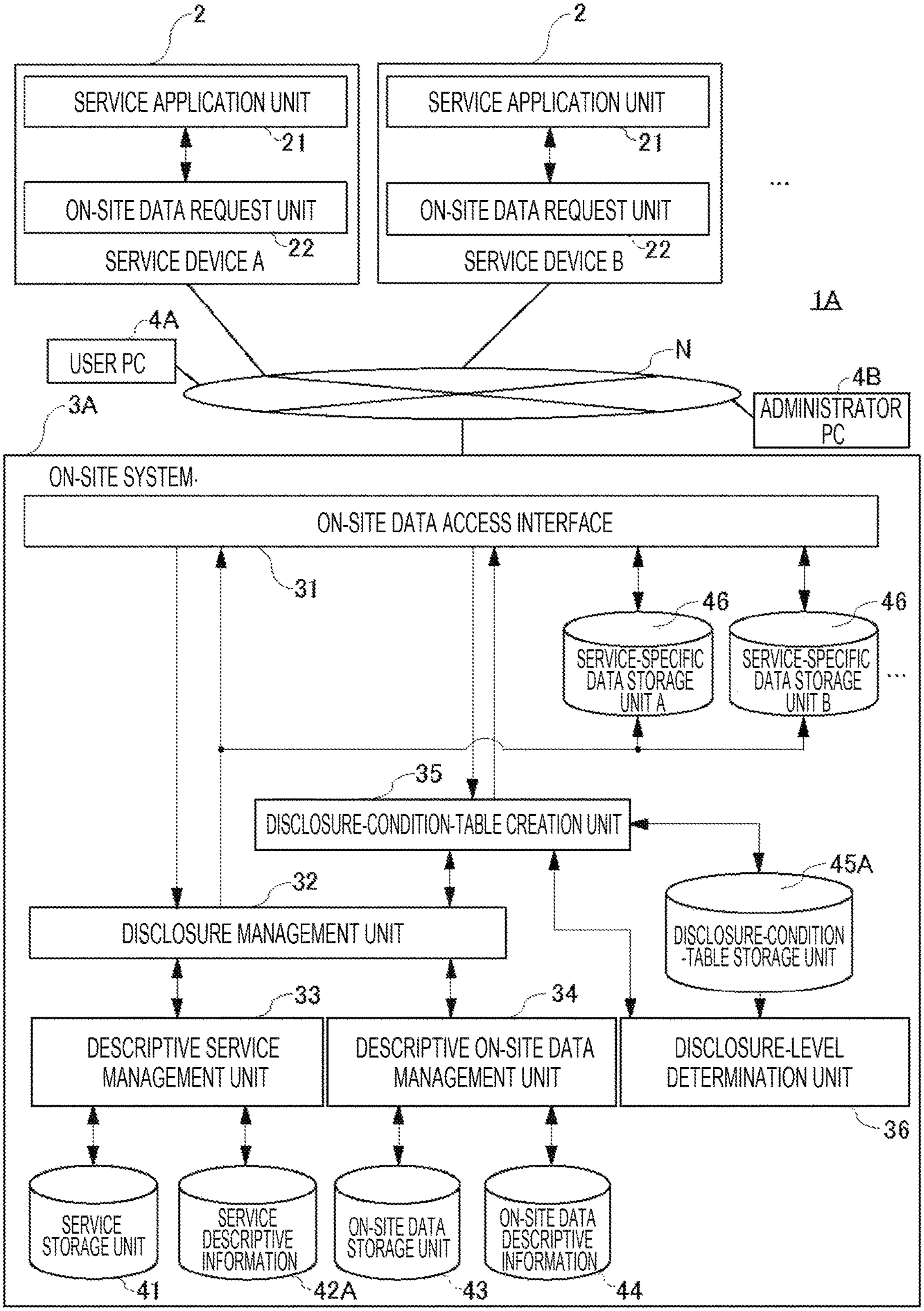
FIG. 11 is a block diagram showing an internal configuration example of a data management system according to a second embodiment of the present invention.

FIG. 11 is a block diagram showing an internal configuration example of a data management system 1A. The on-site system 3A provided in the data management system 1A includes a disclosure-level determination unit 36, unlike the on-site system 3 shown in FIG. 1 according to the first embodiment described above.

In accordance with an instruction of a disclosure-condition-table creation unit 35, the disclosure-level determination unit 36 determines a disclosure level for each service purpose based on a purpose of a new service and a score provided to a data characteristic of on-site data required by the service. Here, configurations of service descriptive information 42A and a disclosure-condition-table storage unit 45A are different from configurations of the service descriptive information 42 and the disclosure-condition-table storage unit 45 according to the first embodiment described above.

Then, the on-site data provided by a disclosure management unit 32 to the service device 2 is changed depending on the disclosure level determined by the disclosure-level determination unit 36.

FIG. 12 is a configuration view of a purpose-specific service management table 42At. The purpose-specific service management table 42At is configured in the service descriptive information 42A, and indicates a relationship among a service purpose, a disclosure level for each service purpose, and a service for each service purpose.

The purpose-specific service management table 42At has items of purpose identification information and a purpose list similarly to the purpose-specific service management table 42*t* shown in FIG. 3.

However, in the item of the purpose identification information, a disclosure level of on-site data is defined in addition to the purpose identification information. There are one or more disclosure levels for one purpose. For example, for "purpose: 1", "disclosure level: 1" and "disclosure level: 2" are provided.

The item of a service for each purpose stores a service corresponding to the service purpose.

FIG. 13 is a configuration view of a purpose-specific data-characteristic management table 45At. The purpose-specific data-characteristic management table 45At is configured in the disclosure-condition-table storage unit 45A. This purpose-specific data-characteristic management table 45At represents a relationship among each service purpose, a disclosure level for each purpose, and a data characteristic required by the service purpose.

Similarly to the purpose-specific data-characteristic management table 45*t* shown in FIG. 7, the purpose-specific data-characteristic management table 45At has items of purpose identification information and a data characteristic for each purpose.

However, in the item of the purpose identification information, a disclosure level of on-site data is defined in addition to the purpose identification information. Similarly to the purpose-specific service management table 42At, there are one or more of disclosure levels for one purpose included in the purpose-specific data-characteristic management table 45At.

The item of a data characteristic for each purpose stores a purpose list of a service requiring the data characteristic.

This purpose-specific data-characteristic management table 45At is a combination of a purpose list corresponding to the purpose-specific service management table 42At and a data-characteristic list corresponding to an on-site-data-specific data-characteristic management table 44*t*1. Therefore, a column of the purpose-specific data-characteristic management table 45At stores the purpose list, and a row stores the data-characteristic list.

However, the purpose-specific data-characteristic management table 45At stores determination standards (hereinafter referred to as "score") for a disclosure level for each data characteristic. The score is a value for performing predetermined weighting on certain data characteristics. For example, if the score is low, the data characteristic is not important, but as the score becomes higher, it indicates that the data characteristic is important.

Figure 14:
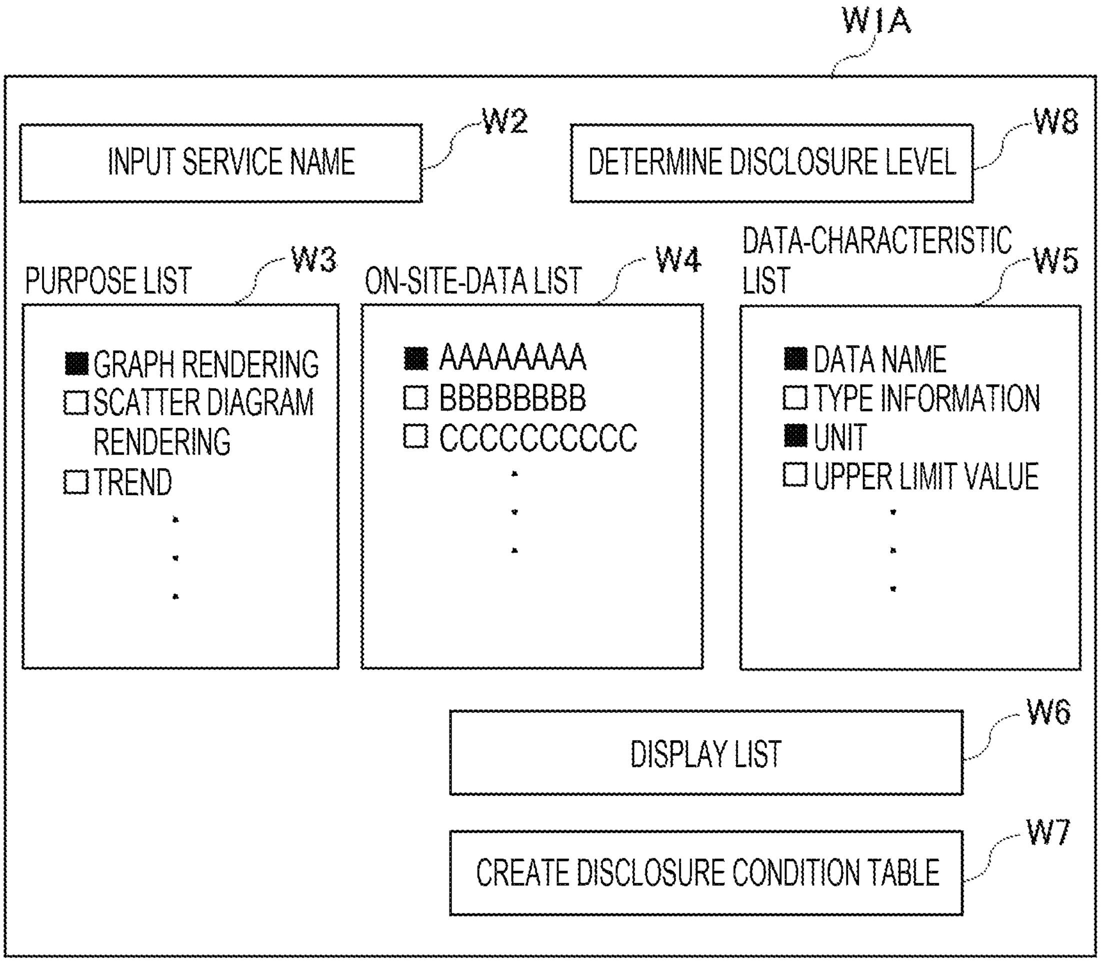
FIG. 14 is a configuration view of a screen that displays a purpose list, a data list, and a data-characteristic list that can be acquired from an on-site system by a service device according to the second embodiment of the present invention.

FIG. 14 is a configuration view of a screen W1A that displays a purpose list, a data list, and a data-characteristic list that can be acquired by the service device 2 from the on-site system 3A. The screen W1A is also displayed on an administrator PC 4B and can be used by an administrator only.

The screen W1A includes a disclosure-level determination button W8 for the administrator to instruct the on-site system 3A to determine a disclosure level based on contents selected in the areas W3 to W5, in addition to the individual areas of the screen W1.

When the administrator presses the disclosure-level determination button W8 after inputting a new service in a service name input area W2, the on-site system 3A determines a disclosure level corresponding to a purpose of the new service.

Figure 15:
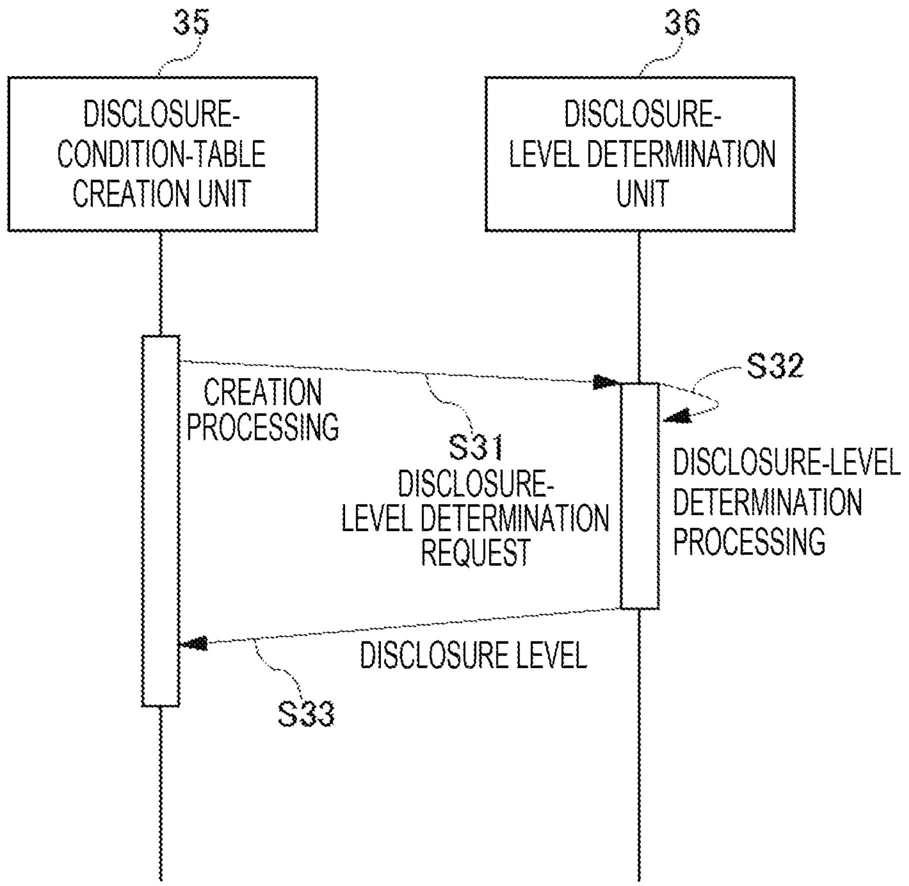
FIG. 15 is a sequence diagram showing an example of a disclosure-level determination processing according to the second embodiment of the present invention.

FIG. 15 is a sequence diagram showing an example of disclosure-level determination processing. This processing is added to the creation processing of step S14 in FIG. 9 executed by the disclosure-condition-table creation unit 35 according to the first embodiment.

When the administrator presses the disclosure-level determination button W8 on the screen W1A, a disclosure-level determination request is transmitted from an on-site data request unit 22 to the disclosure-condition-table creation unit 35 through an on-site data access interface 31. Then, the disclosure-condition-table creation unit 35 transmits the disclosure-level determination request to the disclosure-level determination unit 36 (S31).

In accordance with the disclosure-level determination request, the disclosure-level determination unit 36 determines a disclosure level based on a score of a data characteristic shown in FIG. 13 (S32). Then, the disclosure-level determination unit 36 notifies the disclosure-condition-table creation unit 35 of the determined disclosure level (S33).

Then, the disclosure-condition-table creation unit 35 rearranges rows of purposes in the purpose-specific data-characteristic management table 45At in an order of the determined disclosure level, and updates the purpose-specific data-characteristic management table 45At.

Figure 16:
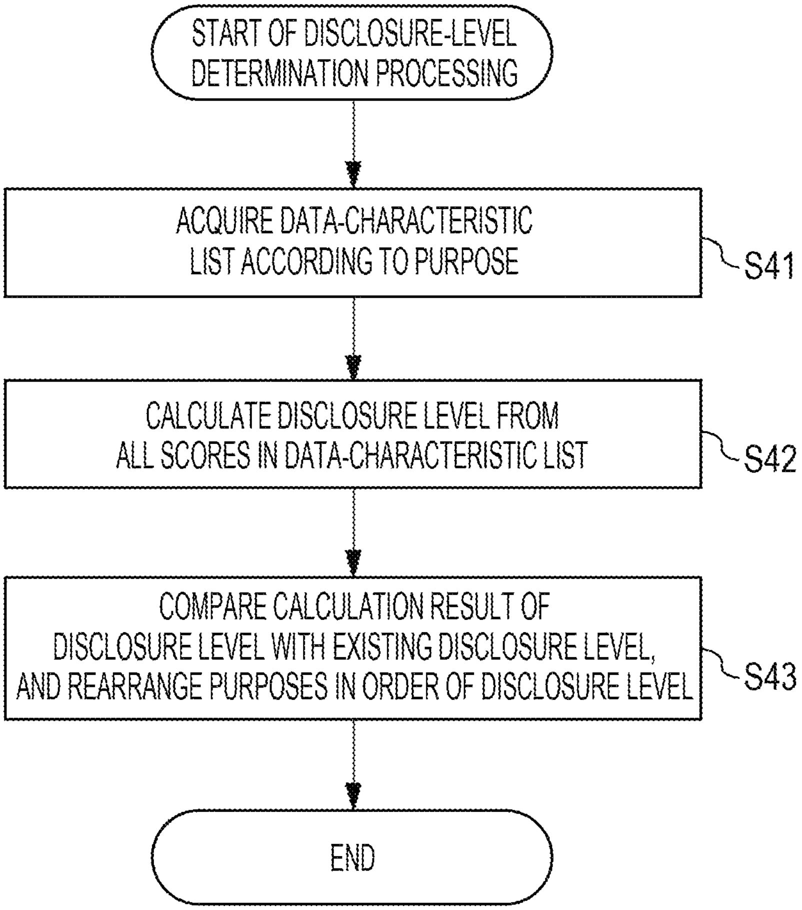
FIG. 16 is a flowchart showing a detailed processing example of the disclosure-level determination processing according to the second embodiment of the present invention.

FIG. 16 is a flowchart showing a detailed processing example of the disclosure-level determination processing.

First, the disclosure-condition-table creation unit 35 acquires a data-characteristic list selected from the screen W1A by the administrator (S41). Next, the disclosure-level determination unit 36 acquires a score corresponding to the acquired data-characteristic list from the purpose-specific data-characteristic management table 45At.

Next, the disclosure-level determination unit 36 calculates a disclosure level from all the scores in the data-characteristic list for a purpose of a new service (S42). For example, if only characteristic A is included in the data-characteristic list, the disclosure level is calculated as "1" since the score is "1". Further, if characteristics A and B are included in the data-characteristic list, the disclosure level is calculated as "2" since the score is "21". Any method may be adopted for calculating the disclosure level. Then, the disclosure level increases in descending order of the total score.

Next, the disclosure-condition-table creation unit 35 compares the calculation result of the disclosure level received from the disclosure-level determination unit 36 for the purpose of the new service, with a disclosure level for a purpose of existing services. When the disclosure levels are different, the disclosure-condition-table creation unit 35 inserts a row of the new disclosure level into the purpose-specific service management table 42At and the purpose-specific data-characteristic management table 45At.

Then, the disclosure-condition-table creation unit 35 rearranges rows of purposes in an order of the disclosure level of purposes inserted with the row of the new disclosure level in an order of the disclosure level in the purpose-specific service management table 42At and the purpose-specific data-characteristic management table 45At (S43), and ends this processing.

In the on-site system 3A according to the second embodiment described above, the disclosure level is determined for each purpose. Then, even if purposes of a plurality of services are the same, the disclosure level can be made different for each service. Therefore, the on-site system 3A can provide the service device 2 with on-site data according to the disclosure level of the service.

Further, the disclosure level is calculated by the disclosure-level determination unit 36 in accordance with the score provided to the data characteristic for each purpose. Therefore, a disclosure level of a data-characteristic list having a data characteristic with a high score becomes higher. Then, the on-site system 3A can provide a part of on-site data to the service device 2 when the disclosure level of the purpose of the service is low, and can provide various types of on-site data to the service device 2 when the disclosure level of the purpose of the service is high. Then, the service device 2 can realize different services according to data characteristics.

Further, the service purpose and the data characteristic are managed by the purpose-specific data-characteristic management table 45At. Therefore, even if the on-site data or the service is changed, the service purpose and the data characteristic are rarely changed, which can facilitate management of the purpose-specific data-characteristic management table 45At.

Meanwhile, an area for input of a score for each data characteristic may be added to the screen W1A. This allows the administrator to change the score at any timing. Then, the disclosure-level determination unit 36 may re-determine the disclosure level based on the changed score, and the disclosure-condition-table creation unit 35 may rearrange the rows of the purpose-specific data-characteristic management table 45At based on the re-determined disclosure level.

In addition, the present invention is not limited to the above-described embodiments, and it is needless to say that various other application examples and modifications can be taken without departing from the gist of the present invention described in the claims.

For example, the above-described embodiments are detailed and concrete description of the configuration of the device and the system for easy understanding of the present invention, and are not necessarily limited to that including all the described configurations. Additionally, a part of a configuration of an embodiment described herein may be replaced with a configuration of another embodiment, and a configuration of an embodiment may be added with a configuration of another embodiment. Moreover, a part of a configuration of each embodiment may also be deleted, replaced, or added with another configuration.

Further, control lines and information lines indicate what is considered to be necessary for the description, and do not necessarily indicate all the control lines and the information lines on the product. In practice, it can be considered that almost all the structures are mutually connected.

REFERENCE SIGNS LIST

1 data management system
2 service device
3 on-site system
4A user PC
4B administrator PC
21 service application unit
22 on-site data request unit
31 on-site data access interface
32 disclosure management unit
33 descriptive service management unit
34 descriptive on-site data management unit
35 disclosure-condition-table creation unit
36 disclosure-level determination unit
41 service storage unit
42 service descriptive information
42*t* purpose-specific service management table
43 on-site data storage unit
44 on-site data descriptive information
44*t*1 on-site-data-specific data-characteristic management table
44*t*2 on-site-data-specific detailed-information management table
45 disclosure-condition-table storage unit
45*t* purpose-specific data-characteristic management table
46 service-specific data storage unit

The invention claimed is:

1. An on-site system comprising:

a processor coupled to a network;

a first memory and a second memory coupled to the processor, wherein the first memory stores a disclosure condition table indicating a relationship between a purpose of a service and a data characteristic of on-site data, as a disclosure condition for disclosing the on-site data to a service device that provides the service, wherein the first memory stores service descriptive information of the service indicating the purpose of the service and stores on-site data descriptive information indicating a data characteristic of the on-site data, the data characteristic indicating a type and a value of the data, wherein the second memory stores instructions, that when executed by the processor, configure the processor to:

create the disclosure condition table based on associating the purpose and the service of the service descriptive information with the data characteristic of the on-site data descriptive information, disclose the on-site data to the service device based on the disclosure conditions of the disclosure condition table provide the service device with the on-site data corresponding to the data characteristic associated with the purpose of the service, provide the service device with the on-site data in real time, or store the on-site data in a third memory that is accessible by the service device, acquire a purpose list that is a list of the purpose of the service, from the service descriptive information, acquire a data-characteristic list that is a list of the data characteristic corresponding to the purpose list, from the disclosure condition table, acquire an on-site-data list that is a list of the on-site data corresponding to the data-characteristic list, from the on-site data descriptive information and provide the service device with an integrated list obtained by integrating the purpose list, the data-characteristic list, and the on-site-data list, wherein a disclosure level of the on-site data is defined for a purpose of the service included in the disclosure condition table, and wherein the processor is further configured to provide the service device with the on-site data based on the disclosure level, determine the disclosure level for each purpose of the service based on a score provided to the data characteristic, and rearrange a purpose of the service included in the disclosure condition table in an order of the disclosure level.

* * * * *